United States Patent
Igarashi

(10) Patent No.: US 7,795,950 B2
(45) Date of Patent: Sep. 14, 2010

(54) TEMPERATURE DETECTION CIRCUIT

(75) Inventor: Atsushi Igarashi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/070,211

(22) Filed: Feb. 15, 2008

(65) Prior Publication Data

US 2008/0198899 A1   Aug. 21, 2008

(30) Foreign Application Priority Data

Feb. 17, 2007   (JP)   ............... 2007-037234

(51) Int. Cl.
*H01L 35/00* (2006.01)
(52) U.S. Cl. ...................... 327/513; 327/512
(58) Field of Classification Search .......... 327/512, 327/513, 532, 551, 552; 361/56
See application file for complete search history.

(56) References Cited

U.S. PATENT DOCUMENTS 6,184,746 B1 *   2/2001   Crowley ............... 327/551
6,255,892 B1 *   7/2001   Gartner et al. ............... 327/512
6,882,213 B2 *   4/2005   Kim ............................ 327/512
7,319,575 B2 *   1/2008   Kawashimo et al. .......... 361/56

FOREIGN PATENT DOCUMENTS

JP   2001165783   6/2001

* cited by examiner

*Primary Examiner*—Hai L Nguyen
(74) *Attorney, Agent, or Firm*—Adams & Wilks

(57) ABSTRACT

A temperature detection circuit has a temperature sensor circuit whose output voltage changes with a variation in temperature. A reference voltage circuit generates a reference voltage. A comparator has an output terminal and compares an output voltage from the temperature sensor circuit with the reference voltage to generate one of a temperature detection signal and a temperature non-detection signal, the comparator having an output terminal. An operation preventing circuit is connected with the output terminal of the comparator such that immediately after activation of a power supply to the temperature detection circuit, the comparator generates the temperature non-detection signal.

1 Claim, 3 Drawing Sheets

TEMPERATURE DETECTION CIRCUIT

BACKGROUND OF THE INVENTION

1. Field of the Invention

The present invention relates to a temperature detection circuit based on temperature characteristics of a semiconductor circuit.

2. Description of the Related Art

FIG. 5 is a schematic diagram showing a normal temperature detection circuit (see JP 2001-165783 A).

The temperature detection circuit includes a temperature sensor circuit 200, a reference voltage circuit 300, a comparator 400, a positive power supply terminal 500, a negative power supply terminal 600, and an output terminal 700. The temperature sensor circuit 200 includes a first terminal, a second terminal, and a third terminal and has a characteristic of reducing an output voltage with an increase in temperature. The first terminal is connected with the positive power supply terminal 500. The second terminal is connected with the negative power supply terminal 600. The third terminal is connected as an output terminal of the temperature sensor circuit 200 with a positive input terminal (+) of the comparator 400. The reference voltage circuit 300 includes a cathode connected with the negative power supply terminal 600 and an anode connected with a negative input terminal (−) of the comparator 400 and generates a reference voltage which is equal to the output voltage of the temperature sensor circuit 200 at a predetermined temperature. The comparator 400 includes a first terminal connected with the positive power supply terminal 500, a second terminal connected with the negative power supply terminal 600, and a third terminal (output terminal) connected with the output terminal 700. The comparator 400 compares the output voltage of the temperature sensor circuit 200 with the reference voltage of the reference voltage circuit 300 to generate a temperature detection signal (negative power supply potential) or a temperature non-detection signal (positive power supply potential).

The operation of the temperature detection circuit shown in FIG. 5 will be described.

When a temperature is lower than the predetermined temperature, the output voltage of the temperature sensor circuit 200 is larger than the reference voltage, so the comparator 400 generates the temperature non-detection signal. On the other hand, when the temperature is equal to or higher than the predetermined temperature, the output voltage of the temperature sensor circuit 200 is equal to or smaller than the reference voltage, so the comparator 400 generates the temperature detection signal. Therefore, the output logic switching operation is performed based on whether or not the temperature is equal to or higher than the predetermined temperature, with the result that the predetermined temperature can be detected.

However, the temperature detection circuit described above may cause the following erroneous operation. Immediately after the activation of the power supply, while the output voltage of the temperature sensor circuit 200 and the reference voltage of the reference voltage circuit 300 are insufficient, the temperature detection circuit generates the temperature detection signal without depending on the temperature because of a relationship between the rising speed of the output voltage of the temperature sensor circuit 200 and the rising rate of the reference voltage of the reference voltage circuit 300.

SUMMARY OF THE INVENTION

An object of the present invention is to prevent the erroneous operation of a temperature detection circuit, which may be caused at the time of activation of the power supply.

According to the prevent invention, there is provided a temperature detection circuit which performs an output logic switching operation based on whether or not a temperature is equal to or higher than a predetermined temperature and which includes a temperature sensor circuit having a characteristic of reducing at least one output voltage thereof with an increase in at least one temperature, a reference voltage circuit for generating at least one reference voltage, a comparator for comparing the at least one output voltage of the temperature sensor circuit with the reference voltage to generate a signal inverted based on a predetermined temperature, and an erroneous operation preventing circuit for controlling an output terminal voltage from the comparator and a positive power supply voltage as an input signal. Particularly, the erroneous operation preventing circuit operates while the output voltage of the temperature sensor circuit and the reference voltage are insufficient.

According to the present invention, the erroneous operation of the temperature detection circuit which may be caused immediately after the activation of the power supply can be prevented.

DETAILED DESCRIPTION OF THE PREFERRED EMBODIMENTS

Hereinafter, embodiments of the present invention will be described in detail with reference to the attached drawings.

First Embodiment

Figure 1:
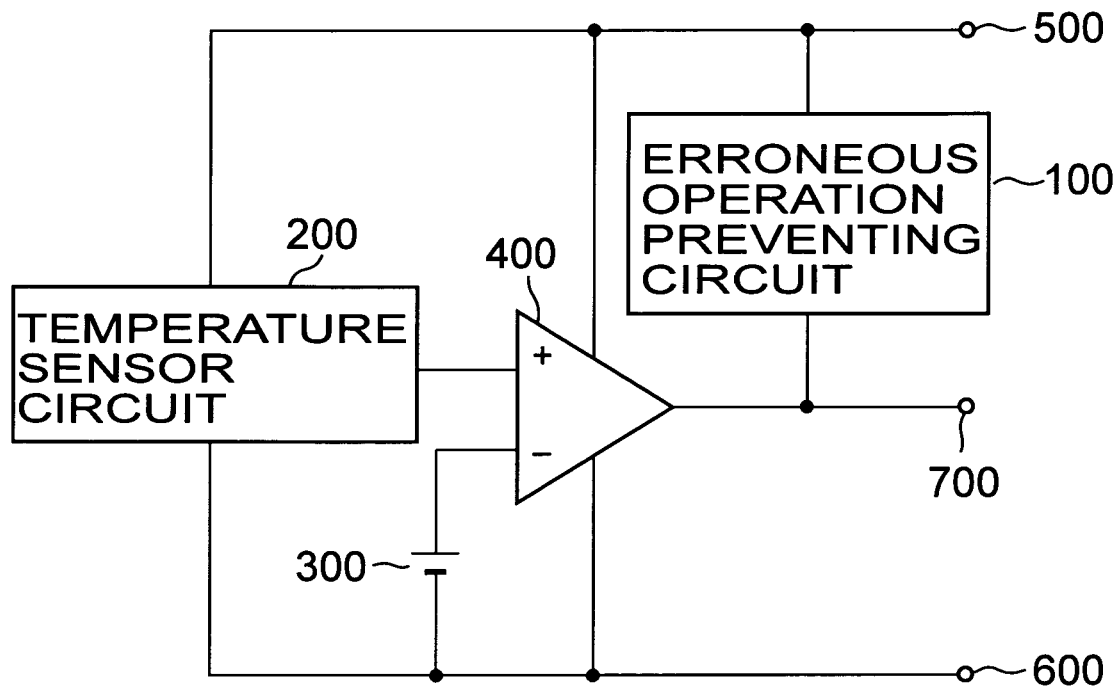
FIG. 1 is a circuit diagram showing a temperature detection circuit according to a first embodiment of the present invention.

A temperature detection circuit according to a first embodiment of the present invention will be described. FIG. 1 is a circuit diagram showing the temperature detection circuit according to the first embodiment of the present invention.

The temperature detection circuit according to the first embodiment of the present invention includes an erroneous operation preventing circuit 100, a temperature sensor circuit 200, a reference voltage circuit 300, a comparator 400, a positive power supply terminal 500, a negative power supply terminal 600, and an output terminal 700.

The temperature sensor circuit 200 includes a first terminal connected with the positive power supply terminal 500, a second terminal connected with the negative power supply terminal 600, and a third terminal connected as an output terminal of the temperature sensor circuit with a positive input terminal (+) of the comparator 400. The temperature sensor circuit 200 includes a Darlington circuit formed of, for example, a plurality of transistors and a constant current circuit for supplying a constant current to the Darlington circuit and has a characteristic of reducing an output voltage with an increase in temperature. The temperature sensor circuit 200 may be a combination of elements each having temperature characteristics, such as resistors.

The reference voltage circuit 300 includes a cathode connected with the negative power supply terminal 600 and an anode connected with a negative input terminal (−) of the comparator 400. A reference voltage of the reference voltage circuit 300 is adjusted by fuse trimming or by changing an element size of a resistor, a MOS transistor, or the like using an electrically erasable and programmable read only memory (EEPROM). The reference voltage circuit 300 generates a reference voltage which is equal to the output voltage of the temperature sensor circuit 200 at a predetermined temperature. The comparator 400 includes a first terminal connected with the positive power supply terminal 500, a second terminal connected with the negative power supply terminal 600, and a third terminal (output terminal) connected with the output terminal 700. The comparator 400 compares the output voltage of the temperature sensor circuit 200 with the reference voltage of the reference voltage circuit 300 to generate a temperature detection signal (negative power supply potential) or a temperature non-detection signal. (positive power supply potential).

The erroneous operation preventing circuit 100 includes a first terminal connected with the positive power supply terminal 500 and a second terminal connected with the output terminal 700. The erroneous operation preventing circuit 100 has a function for connecting and disconnecting the positive power supply terminal 500 with the output terminal 700. Immediately after the activation of the power supply, when the output voltage of the temperature sensor circuit 200 or the reference voltage of the reference voltage circuit 300 is insufficient, the positive power supply terminal 500 is short-circuited with the output terminal 700. On the other hand, when the output voltage of the temperature sensor circuit 200 and the reference voltage of the reference voltage circuit 300 are sufficient, an open circuit is caused between the positive power supply terminal 500 and the output terminal 700.

Next, the operation of the temperature detection circuit will be described.

Immediately after the activation of the power supply, the output voltage of the temperature sensor circuit 200 and the reference voltage of the reference voltage circuit 300 gradually increase from 0 V. When the output voltage of the temperature sensor circuit 200 or the reference voltage of the reference voltage circuit 300 is insufficient, the erroneous operation preventing circuit 100 short-circuits between the output terminal 700 and the positive power supply terminal 500. Then, a temperature non-detection signal is forcedly outputted from the output terminal 700. After the lapse of a sufficient time from the activation of the power supply, when the output voltage of the temperature sensor circuit 200 and the reference voltage of the reference voltage circuit 300 are sufficient, the erroneous operation preventing circuit 100 opens between the output terminal 700 and the positive power supply terminal 500. Therefore, when a temperature is lower than the predetermined temperature, the output voltage of the temperature sensor circuit 200 is larger than the reference voltage, so the temperature non-detection signal is outputted from the output terminal 700. On the other hand, when the temperature is equal to or higher than the predetermined temperature, the output voltage of the temperature sensor circuit 200 is equal to or smaller than the reference voltage, so a temperature detection signal is outputted from the output terminal 700.

As described above, when the output logic switching operation is performed based on whether or not the temperature is equal to or higher than the predetermined temperature, the predetermined temperature can be detected.

While the output voltage of the temperature sensor circuit 200 and the reference voltage of the reference voltage circuit 300 are insufficient after the activation of the power supply, even when the temperature is lower than the predetermined temperature, the output voltage of the temperature sensor circuit 200 may become lower than the reference voltage of the reference voltage circuit 300 in the conventional case because, for example, a rising time of the output voltage of the temperature sensor circuit 200 is longer than a rising time of the reference voltage of the reference voltage circuit 300. However, according to the temperature detection circuit, even in such a case, it is possible to prevent the comparator from generating the temperature detection signal. That is, the erroneous operation of the temperature detection circuit can be prevented.

In addition to this, it is expected to short-circuit between the positive input terminal of the comparator 400 and the positive power supply terminal 500 or between the negative input terminal of the comparator 400 and the negative power supply terminal 600. In order to more reliably output the temperature non-detection signal from the output terminal 700, the output terminal 700 is desirably short-circuited with the positive power supply terminal 500.

Second Embodiment

Figure 2:
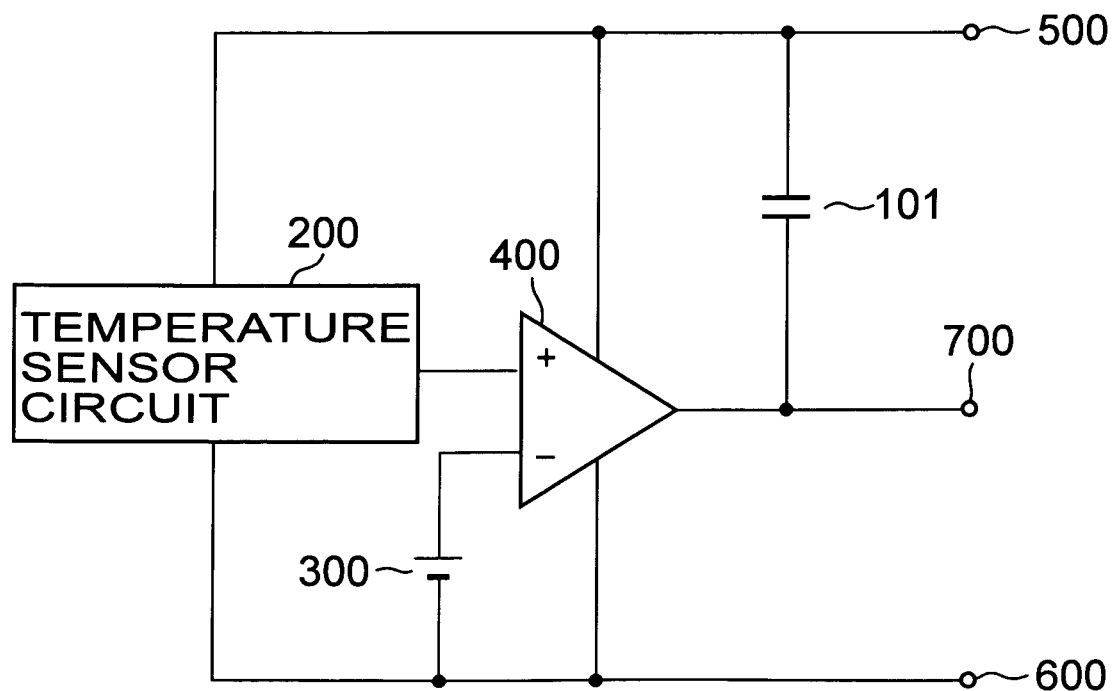
FIG. 2 is a circuit diagram showing a temperature detection circuit according to a second embodiment of the present invention.

A temperature detection circuit according to a second embodiment of the present invention will be described. FIG. 2 is a circuit diagram showing the temperature detection circuit according to the second embodiment of the present invention.

The temperature detection circuit according to the second embodiment is different from the temperature detection circuit according to the first embodiment in that the erroneous operation preventing circuit includes a capacitor 101. The capacitor 101 includes a first terminal connected with the positive power supply terminal 500 and a second terminal connected with the output terminal 700.

Next, the operation of the temperature detection circuit will be described.

Immediately after the activation of the power supply, a change in signal from the output terminal 700 follows only an instantaneous change in power supply voltage because a system in the case where the output terminal 700 is viewed from the positive power supply terminal 500 includes a high-pass filter (HPF) formed of the capacitor 101 and an output resistor of the comparator 400. Therefore, the output terminal 700 is short-circuited with the positive power supply terminal 500 through the capacitor 101, with the result that the temperature non-detection signal is forcedly outputted from the output terminal 700. After the lapse of a sufficient time from the activation of the power supply, the output terminal 700 is not affected by the positive power supply terminal 500 because the capacitor 101 acts only as a load of the comparator 400. Thus, when a temperature is lower than the predetermined temperature, the output voltage of the temperature sensor circuit 200 is larger than the reference voltage, so the temperature non-detection signal is outputted from the output terminal 700. On the other hand, when the temperature is equal to or higher than the predetermined temperature, the output voltage of the temperature sensor circuit 200 is equal to or smaller than the reference voltage, so the temperature detection signal is outputted from the output terminal 700.

As described above, when the output logic switching operation is performed based on whether or not the temperature is equal to or higher than the predetermined temperature, the predetermined temperature can be detected.

According to the temperature detection circuit, when the output voltage of the temperature sensor circuit 200 or the reference voltage of the reference voltage circuit 300 is insufficient after the activation of the power supply, the erroneous operation can be prevented.

Third Embodiment

Figure 3:
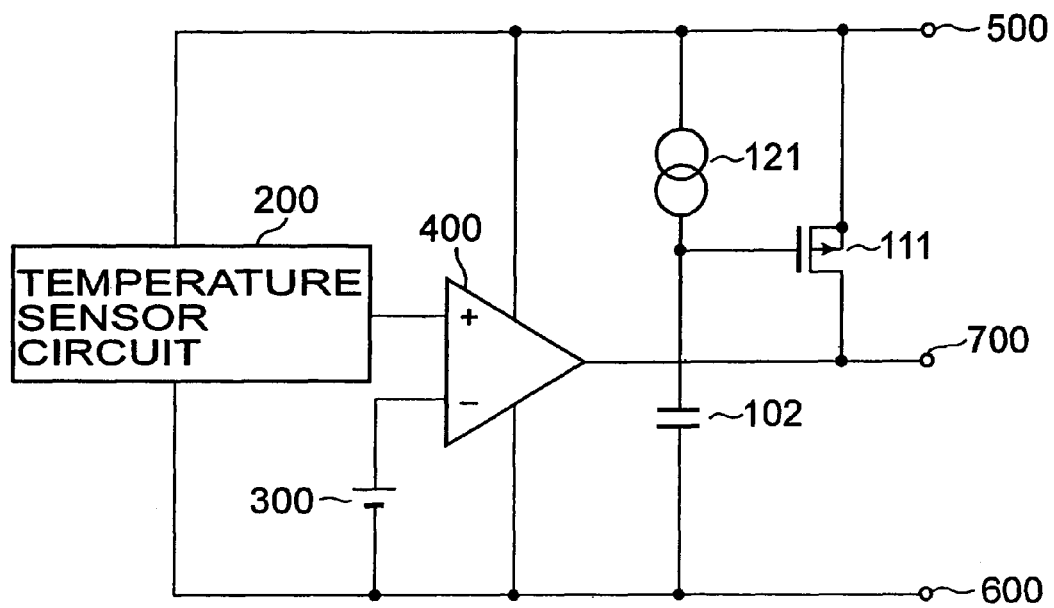
FIG. 3 is a circuit diagram showing a temperature detection circuit according to a third embodiment of the present invention.

A temperature detection circuit according to a third embodiment of the present invention will be described. FIG. 3 is a circuit diagram showing the temperature detection circuit according to the third embodiment of the present invention.

The temperature detection circuit according to the third embodiment is different from the temperature detection circuit according to the first embodiment in that the erroneous operation preventing circuit includes a MOS transistor 111, a constant current circuit 121, and a capacitor 102. The MOS transistor 111 includes a source terminal connected with the positive power supply terminal 500, a drain terminal connected with the output terminal 700, and a gate terminal connected with a first terminal of the constant current circuit 121 and a first terminal of the capacitor 102. A second terminal of the constant current circuit 121 is connected with the positive power supply terminal 500. A second terminal of the capacitor 102 is connected with the negative power supply terminal 600.

Next, the operation of the temperature detection circuit will be described.

Immediately after the activation of the power supply, the constant current circuit 121 hardly generates a current, so a voltage produced between both ends (first and second terminals) of the capacitor 102 is substantially 0 V, thereby short-circuiting the gate terminal of the MOS transistor 111 with the negative power supply terminal 600. Then, the MOS transistor 111 is turned ON, with the result that the output terminal 700 is short-circuited with the positive power supply terminal 500 to forcedly output the temperature non-detection signal from the output terminal 700. After the lapse of a sufficient time from the activation of the power supply, charges are being stored in the capacitor 102 by the constant current circuit 121 to gradually increase a gate potential of the MOS transistor 111. When a gate-source voltage of the MOS transistor 111 becomes smaller than a threshold voltage Vth of the MOS transistor 111, the MOS transistor 111 is turned OFF. While the MOS transistor is turned OFF, the output terminal 700 is open-circuited from the positive power supply terminal 500. Therefore, when a temperature is lower than the predetermined temperature, the output voltage of the temperature sensor circuit 200 is larger than the reference voltage, so the temperature non-detection signal is outputted from the output terminal 700. On the other hand, when the temperature is equal to or higher than the predetermined temperature, the output voltage of the temperature sensor circuit 200 is equal to or smaller than the reference voltage, so the temperature detection signal is outputted from the output terminal 700.

As described above, when the output logic switching operation is performed based on whether or not the temperature is equal to or higher than the predetermined temperature, the predetermined temperature can be detected.

According to the temperature detection circuit, when the output voltage of the temperature sensor circuit 200 or the reference voltage of the reference voltage circuit 300 is insufficient after the activation of the power supply, the erroneous operation can be prevented.

In this embodiment, the MOS transistor 111 is controlled by the constant current circuit 121 and the capacitor 102. The MOS transistor 111 may be controlled to be turned OFF in response to a detection signal indicating that the power supply voltage, the output voltage of the temperature sensor circuit 200, and the reference voltage of the reference voltage circuit 300 are sufficient. The MOS transistor 111 may be controlled in response to a signal from another block of the same chip.

Fourth Embodiment

Figure 4:
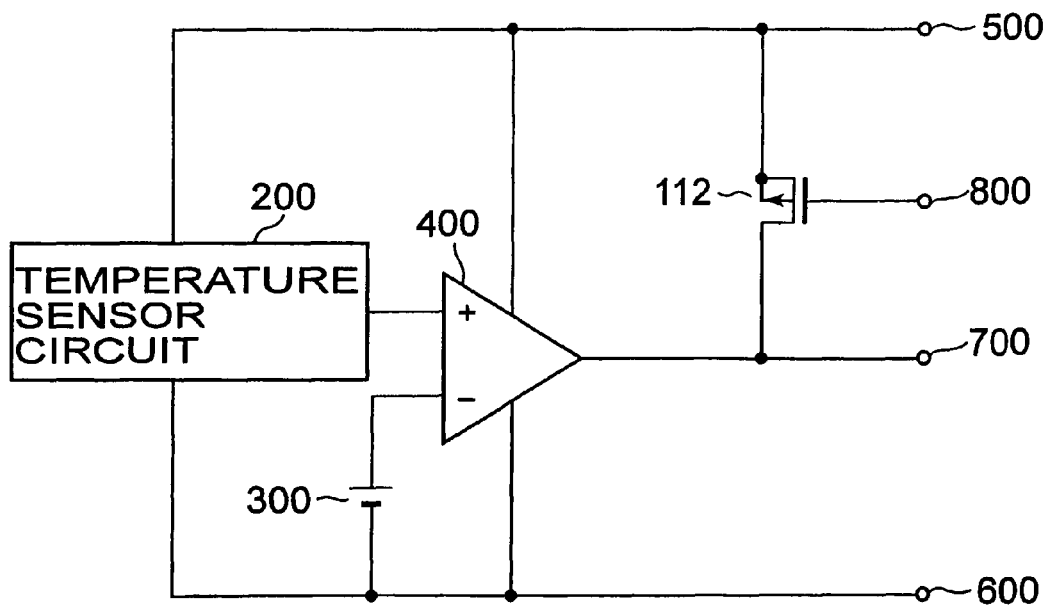
FIG. 4 is a circuit diagram showing a temperature detection circuit according to a fourth embodiment of the present invention.
Figure 5:
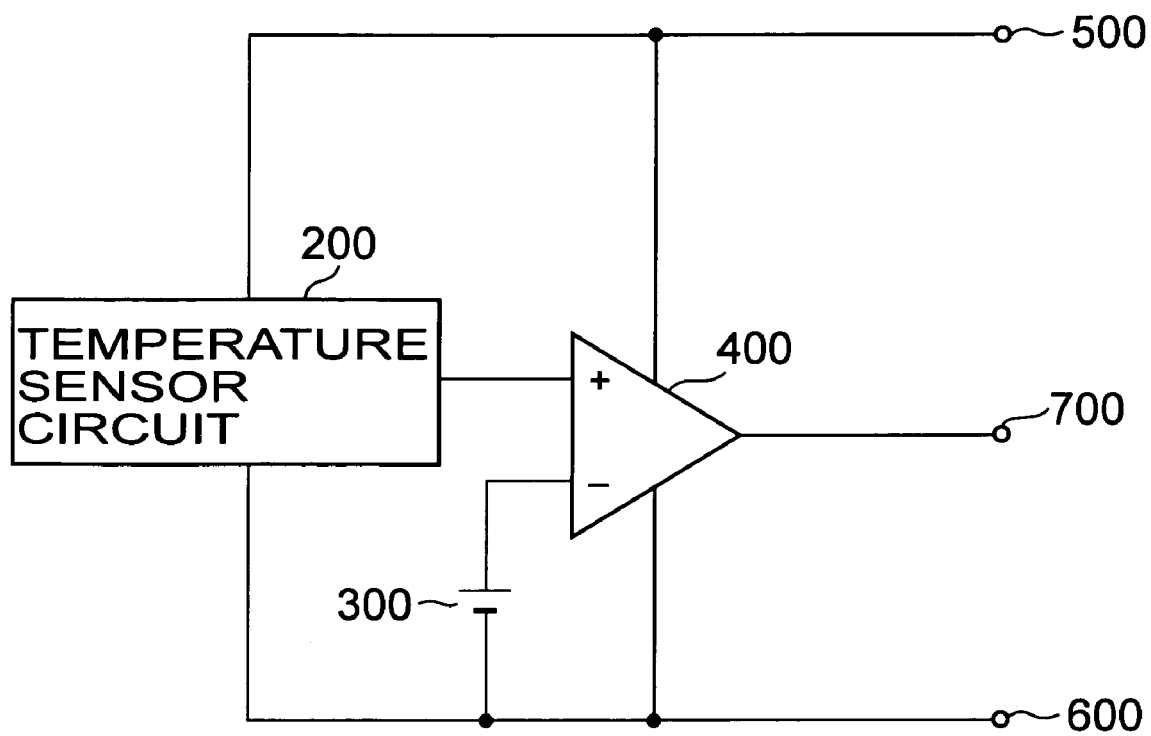
FIG. 5 is a circuit diagram showing a normal temperature detection circuit.

A temperature detection circuit according to a fourth embodiment of the present invention will be described. FIG. 4 is a circuit diagram showing the temperature detection circuit according to the fourth embodiment of the present invention.

The temperature detection circuit according to the fourth embodiment is different from the temperature detection circuit according to the first embodiment in that the erroneous operation preventing circuit includes a MOS transistor 112 and a control terminal 800. The MOS transistor 112 includes a source terminal connected with the positive power supply terminal 500, a drain terminal connected with the output terminal 700, and a gate terminal connected with the control terminal 800. The control terminal 800 is inputted with a signal from a device located outside a chip including the temperature detection circuit, such as a microcomputer.

Next, the operation of the temperature detection circuit will be described.

Immediately after the activation of the power supply, when the negative power supply potential is supplied from the outside to the control terminal, the MOS transistor 112 is turned ON, so the output terminal 700 is short-circuited with the positive power supply terminal 500 to forcedly output the temperature non-detection signal from the output terminal 700. After the lapse of a sufficient time from the activation of the power supply, when the positive power supply potential is supplied from the outside to the control terminal, the MOS transistor 112 is turned OFF, so the output terminal 700 is open-circuited from the positive power supply terminal 500. Therefore, when a temperature is lower than the predetermined temperature, the output voltage of the temperature sensor circuit 200 is larger than the reference voltage, so the temperature non-detection signal is outputted from the output terminal 700. On the other hand, when the temperature is equal to or higher than the predetermined temperature, the output voltage of the temperature sensor circuit 200 is equal to or smaller than the reference voltage, so the temperature detection signal is outputted from the output terminal 700.

As described above, when the output logic switching operation is performed based on whether or not the temperature is equal to or higher than the predetermined temperature, the predetermined temperature can be detected.

According to the temperature detection circuit, when the output voltage of the temperature sensor circuit 200 or the reference voltage of the reference voltage circuit 300 is insufficient after the activation of the power supply, the erroneous operation can be prevented.

What is claimed is:

1. A temperature detection circuit, comprising:
   a temperature sensor circuit whose output voltage changes with a variation in temperature;
   a reference voltage circuit that generates a reference voltage;
   a comparator that compares an output voltage from the temperature sensor circuit with the reference voltage to generate one of a temperature detection signal and a temperature non-detection signal, the comparator having an output terminal;
   a positive power supply terminal, a negative power supply terminal, and an output terminal connected to the output terminal of the comparator; and
   an erroneous operation preventing circuit that is connected with the output terminal of the comparator such that immediately after activation of a power supply to the temperature detection circuit, the comparator generates the temperature non-detection signal, the erroneous operation preventing circuit having a first terminal connected with the positive power supply terminal and a second terminal connected with the output terminal of the temperature detection circuit, wherein the erroneous operation preventing circuit controls the comparator such that immediately after activation of the power supply, when the output voltage of the temperature sensor circuit or the reference voltage of the reference voltage circuit is insufficient, the positive power supply terminal is short-circuited with the output terminal of the temperature detection circuit to cause the temperature non-detection signal to be forcedly outputted from the output terminal of the temperature detection circuit.

* * * * *